Patented Mar. 7, 1933

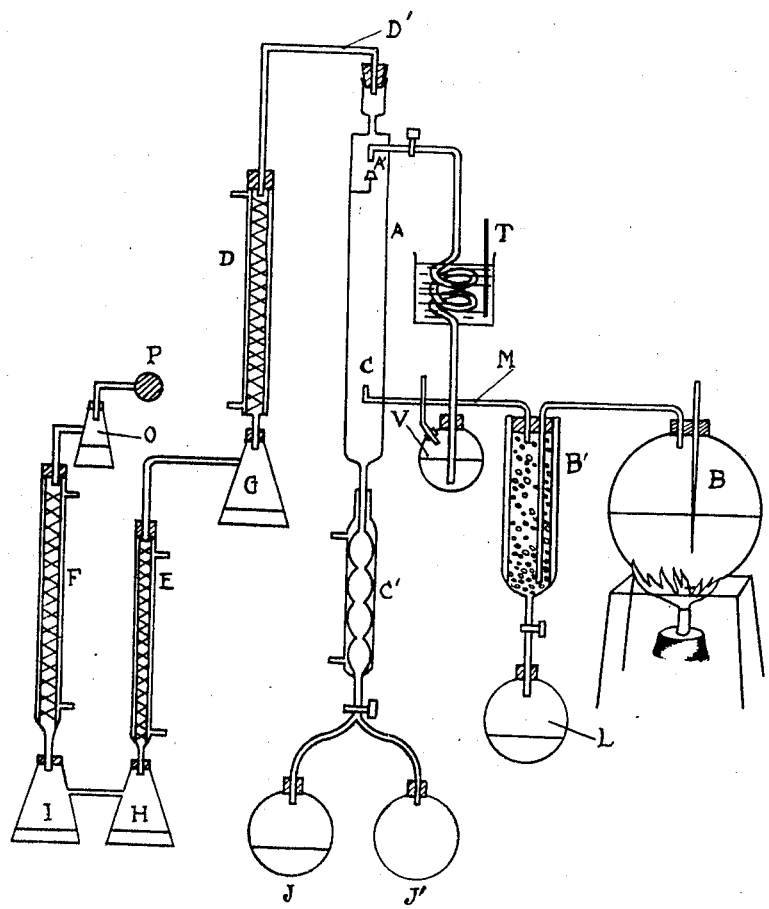
MARC COUPEAU &
MAURICE DELAVILLE
Inventors

1,900,694

UNITED STATES PATENT OFFICE

MARC COUPEAU, OF PARIS, AND MAURICE DELAVILLE, OF ST. MAURICE, FRANCE, ASSIGNORS OF ONE-THIRD TO ANDRÉ CORNILLAC, OF PARIS, FRANCE

APPARATUS FOR THE REMOVAL OF ALCOHOL FROM WINE, CIDER, BEER, AND OTHER ALCOHOLIC PRODUCTS

Original application filed July 23, 1930, Serial No. 469,982, and in France June 25, 1930. Divided and this application filed August 7, 1931. Serial No. 555,666.

The present invention relates to an installation for the removal of alcohol from wines or other alcoholic liquids, without raising any portion of the liquid under treatment to a temperature near its boiling point under the degree of vacuum at which the treatment is effected.

This application is also in the nature of a division of our copending application filed July 23, 1930, bearing Serial No. 469,982.

The accompanying diagrammatic drawing shows by way of example an installation according to the invention, and herein the several apparatus of the installation are shown diagrammatically as laboratory apparatus, but they may be of any construction adapted for industrial manufacture.

The installation essentially comprises a chamber A, with a vacuum pump P communicating with said chamber for producing a vacuum therein; at the upper part of said chamber is mounted a sprayer A' by which the liquid to be freed from alcohol is brought from its tank V into the chamber A in the form of fine spray due to the suction of the vacuum; at the lower part of the chamber is mounted an injector C for a supply of steam which is produced at low temperature in the boiler B or the like; at the top of said chamber is positioned a conduit D' for circulating, out of the chamber and to the said vacuum pump, the vapor of water, alcohol and other substances withdrawn by the pump. One or more vessels J—J' are mounted at the lower part of the chamber in order to receive the liquid which has been freed from alcohol. A drying device B' can be positioned between the boiler B and the injector C in order to dry the steam, and the condensed water descends into a vessel L.

The liquid to be freed from alcohol is preferably heated, before reaching the sprayer A', to a temperature practically equal to that of the steam injected at C and circulating upwardly in the chamber A, and this can be effected by means of a heating worm T whose temperature may be regulated by any suitable means, and preferably by a thermostat; in this case, a cooling device C' may be mounted between the chamber C and the vessels J—J' for cooling the liquid which has been freed from alcohol.

The steam and alcohol, and any other bodies accompanying them, are condensed between the outlet of the chamber A and the vacuum pump P, and preferably by the fractional method, by the use of coolers D—E—F and of vessels G—H—I—O.

If wine is to be treated for removing the alcohol, the operation is preferably as follows. The vessel V is filled, not with the original wine, but with wine from which its aromatic constituents have been preliminarily removed in the cold state, and the said constituents will then be added to the wine, freed from its alcohol, which collects in the vessels J—J', in conformity to the process disclosed in patent application Serial Number 469,982.

Obviously, the arrangement and the construction of the various apparatus comprised in the installation are susceptible of all suitable modifications without departing from the spirit of the invention.

We claim:

An apparatus for the treatment of wines or other alcoholic liquids for the removal of alcohol therefrom, comprising a still provided with a chamber having a distilling space which is substantially clear and unobstructed throughout the total height of said chamber, a vacuum pump communicating therewith, a sprayer mounted at the upper part of said chamber together with means for supplying the same with the liquid to be treated, an injector mounted at the lower part of said chamber and means for supplying steam to the same, a conduit at the top of said chamber for the exit of the said steam charged with alcohol vapors, the lower part of the chamber being connected with a vessel adapted to collect the liquid which has been freed from alcohol.

In testimony whereof we have signed this specification.

MARC COUPEAU.
MAURICE DELAVILLE.